(No Model.)
C. COLLINS.
AXLE NUT.
No. 594,328. Patented Nov. 23, 1897.
Fig. 1.
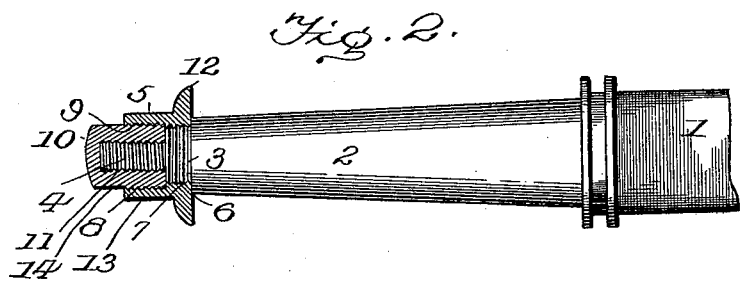
Fig. 2.
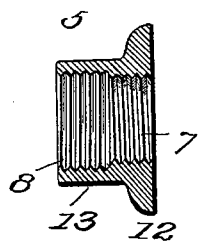
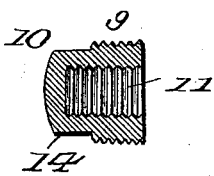
Witnesses
Inventor
Curtis Collins
By Francis M. Wright,
Attorney

UNITED STATES PATENT OFFICE.

CORTIES COLLINS, OF DALLAS, TEXAS.

AXLE-NUT.

SPECIFICATION forming part of Letters Patent No. 594,328, dated November 23, 1897.

Application filed April 5, 1897. Serial No. 630,822. (No model.)

*To all whom it may concern:*

Be it known that I, CORTIES COLLINS, a citizen of the United States, residing at Dallas, in the county of Dallas and State of Texas, have invented certain new and useful Improvements in Axle-Nuts, of which the following is a specification.

My invention relates to improvements in axle-nuts for carriages and wagons.

The object of my invention is to provide means whereby the carriage-wheel may be securely retained upon the end of the axle and prevented from becoming loose thereon or being detached, said means being simple in construction and operation and economical in cost.

In the accompanying drawings, Figure 1 is a side elevation of one end of a carriage-axle with my improvement applied thereto. Fig. 2 is a longitudinal vertical section of the same. Fig. 3 is a section of the nut detached, and Fig. 4 is a section of the threaded washer detached.

1 represents the axle, and 2 its bearing-surface for the wheel-hub, terminating in a left-handed screw-threaded portion 3 and in a narrower right-handed screw-threaded portion 4. The nut 5 is adapted to be screwed on the threaded portion 3 up to the shoulder 6 on the axle above said threaded portion, being for this purpose provided with a left-handed female thread 7 at one end of said nut. The other end of the nut is provided with a right-handed female thread 8, arranged to be engaged by a right-handed male thread 9 on the washer 10, which likewise has a right-handed female thread 11 to engage the right-handed male thread 4 on the extreme end of the axle.

The nut 5 is provided with a flange 12, extending beyond the shoulder 6 to keep the wheel-hub in place, and has square shoulders 13 to be engaged by a wrench, and likewise the washer 10 has shoulders 14, whereby it can be operated with a wrench.

By reason of the opposite directions of the screw-threaded engagements of the nut 5 with the axle and with the washer 10 and by reason of the opposite directions of the screw-threaded engagements of the axle with the nut and washer it will be seen that any tendency of the axle-nut to unscrew communicates to the washer a motion in a direction securing it more tightly on the axle. Thus the wheel is very securely retained in place.

I claim—

1. The combination of an axle or bar having at its end a portion threaded in one direction and adjacent thereto a portion threaded in the opposite direction, a nut threaded on one of said portions having also a second thread of opposite direction to that engaging the axle, and a washer secured on the oppositely-threaded portion of the axle and also engaging the second thread of the nut, substantially as described.

2. The combination of an axle or bar having at one end a portion threaded in one direction and adjacent thereto a portion threaded in the opposite direction, a nut threaded on one of said portions having also a second female thread of opposite direction to that engaging the axle, and a washer having a female thread engaging the oppositely-threaded portion of the axle and a male thread engaging the second thread of the washer, substantially as described.

In witness whereof I have hereunto set my hand in the presence of two subscribing witnesses.

CORTIES COLLINS.

Witnesses:
W. F. DOUGHERTY,
J. S. DOWNS.